(12) United States Patent
Kuriyagawa et al.

(10) Patent No.: US 8,515,604 B2
(45) Date of Patent: Aug. 20, 2013

(54) OUTBOARD MOTOR CONTROL APPARATUS

(75) Inventors: Koji Kuriyagawa, Wako (JP); Hajime Yoshimura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 337 days.

(21) Appl. No.: 12/967,248

(22) Filed: Dec. 14, 2010

(65) Prior Publication Data

US 2011/0143611 A1    Jun. 16, 2011

(30) Foreign Application Priority Data

Dec. 16, 2009   (JP) ................... 2009-285807

(51) Int. Cl.
*B63H 21/21* (2006.01)
*B60W 10/04* (2006.01)
*G06F 19/00* (2011.01)

(52) U.S. Cl.
USPC ............................................. 701/21; 440/86

(58) Field of Classification Search
USPC ............. 701/21, 55; 440/86, 84, 1; 123/497, 123/684
See application file for complete search history.

(56) References Cited

U.S. PATENT DOCUMENTS

| 6,357,423 | B1* | 3/2002 | Kanno | 123/497 |
| 6,453,897 | B1* | 9/2002 | Kanno | 123/684 |
| 6,550,457 | B1 | 4/2003 | Kitagawa et al. | |
| 7,089,103 | B2 | 8/2006 | Katakura et al. | |
| 7,762,859 | B2 | 7/2010 | Suzuki et al. | |
| 7,892,052 | B2 | 2/2011 | Suzuki et al. | |
| 2004/0106337 | A1* | 6/2004 | Okabe | 440/61 S |
| 2004/0121661 | A1* | 6/2004 | Okuyama | 440/1 |
| 2009/0209151 | A1 | 8/2009 | Suzuki et al. | |

FOREIGN PATENT DOCUMENTS

| JP | 4-159195 A | 6/1992 |
| JP | 10-329586 A | 12/1998 |
| JP | 2003-106203 A | 4/2003 |
| JP | 2005-009343 A | 1/2005 |
| JP | 2008-075469 A | 4/2008 |
| JP | 2009-190671 A | 8/2009 |
| JP | 2009-196515 A | 9/2009 |
| JP | 2009-202686 A | 9/2009 |

\* cited by examiner

*Primary Examiner* — Tan Q Nguyen
(74) *Attorney, Agent, or Firm* — Carrier Blackman & Associates, P.C.; William D. Blackman; Anne G. Sabourin (57) ABSTRACT

In an apparatus for controlling operation of an outboard motor having an internal combustion engine to power a propeller and a transmission being selectively changeable in gear position to establish speeds including a first speed and a second speed and transmitting power of the engine to the propeller with a gear ratio determined by established speed, a change amount of throttle opening and a change amount of manifold absolute pressure of the engine are detected, and operation of the transmission is controlled to change the gear position from the second speed to the first speed based on the change amounts of the throttle opening and manifold absolute pressure, thereby enabling to appropriately control the operation of the transmission to suppress the decrease in boat speed even when the resistance of water flow acting on a boat during cruising is increased due to influence of a wave, etc.

8 Claims, 6 Drawing Sheets

OUTBOARD MOTOR CONTROL APPARATUS

BACKGROUND OF THE INVENTION

1. Field of the Invention

This invention relates to an outboard motor control apparatus, particularly to an apparatus for controlling an outboard motor with a transmission.

2. Description of the Related Art

In recent years, there is proposed an outboard motor having a transmission interposed at a location between an internal combustion engine and propeller shaft to change output of the engine in speed and then transmit it to the propeller shaft, as taught, for example, by Japanese Laid-Open Patent Application No. 2009-190671.

SUMMARY OF THE INVENTION

When a boat mounted with such the outboard motor cruises, the boat sometimes climbs up and goes over a relatively big wave and, in this case, the wave influences the resistance of water flow acting on the boat to increase. It results in the insufficiency of the output torque of the engine, whereby the boat speed may be decreased.

An object of this invention is therefore to overcome the foregoing drawbacks by providing an apparatus for controlling an outboard motor having a transmission, which apparatus can appropriately control the operation of the transmission to suppress the decrease in boat speed even when the resistance of water flow acting on a boat during cruising is increased due to influence of a wave, etc.

In order to achieve the object, this invention provides in a first aspect an apparatus for controlling operation of an outboard motor adapted to be mounted on a stern of a boat and having an internal combustion engine to power a propeller through a propeller shaft, and a transmission installed at a location between the engine and the propeller shaft, the transmission being selectively changeable in gear position to establish speeds including at least a first speed and a second speed and transmitting power of the engine to the propeller with a gear ratio determined by established speed, comprising: a throttle opening change amount detector that detects a change amount of throttle opening of the engine: a manifold absolute pressure change amount detector that detects a change amount of manifold absolute pressure in an air intake pipe of the engine: and a transmission controller that controls operation of the transmission to change the gear position from the second speed to the first speed when the second speed is established based on the change amount of the throttle opening and the change amount of the manifold absolute pressure.

In order to achieve the object, this invention provides in a second aspect a method for controlling operation of an outboard motor adapted to be mounted on a stern of a boat and having an internal combustion engine to power a propeller through a propeller shaft, and a transmission installed at a location between the engine and the propeller shaft, the transmission being selectively changeable in gear position to establish speeds including at least a first speed and a second speed and transmitting power of the engine to the propeller with a gear ratio determined by established speed, comprising the step of: detecting a change amount of throttle opening of the engine: detecting a change amount of manifold absolute pressure in an air intake pipe of the engine: and controlling operation of the transmission to change the gear position from the second speed to the first speed when the second speed is established based on the change amount of the throttle opening and the change amount of the manifold absolute pressure.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of an outboard motor control apparatus according to the invention will now be explained with reference to the attached drawings.

Figure 1:
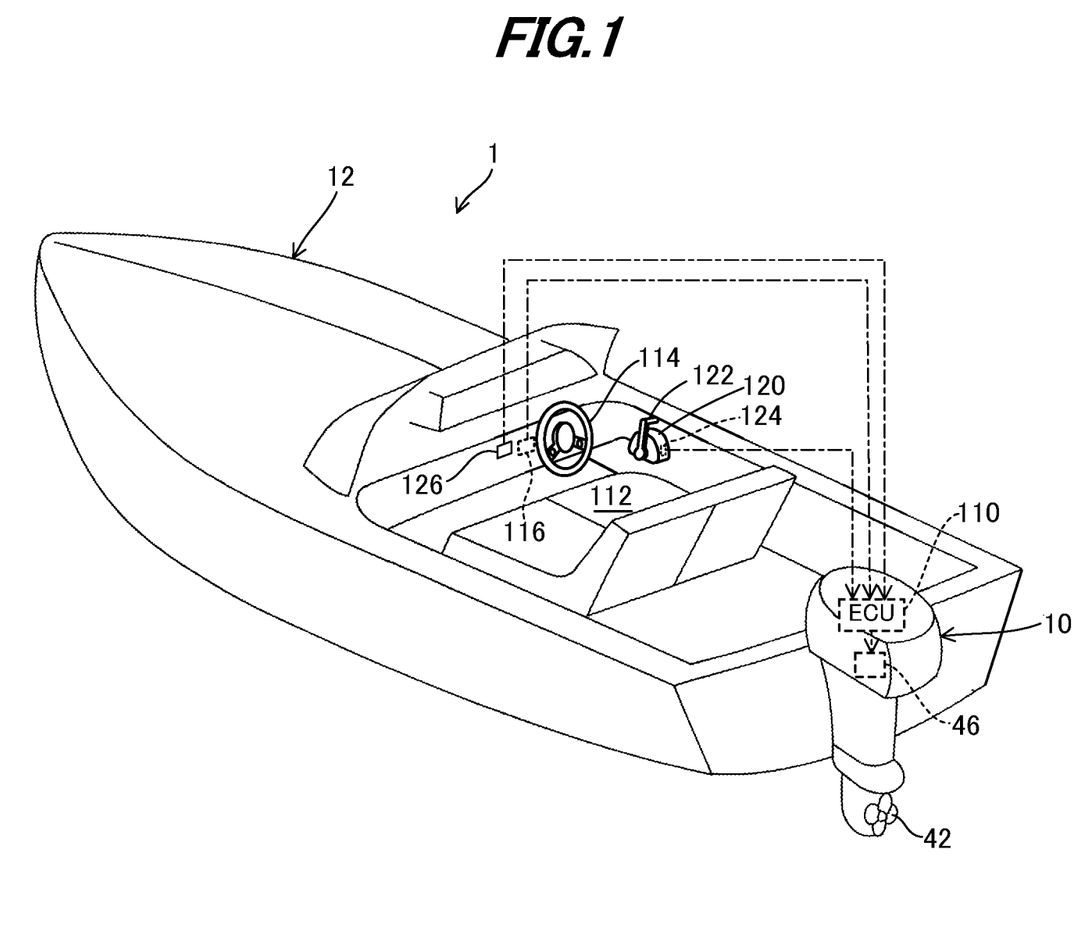
FIG. 1 is an overall schematic view of an outboard motor control apparatus including a boat according to an embodiment of the invention.
Figure 2:
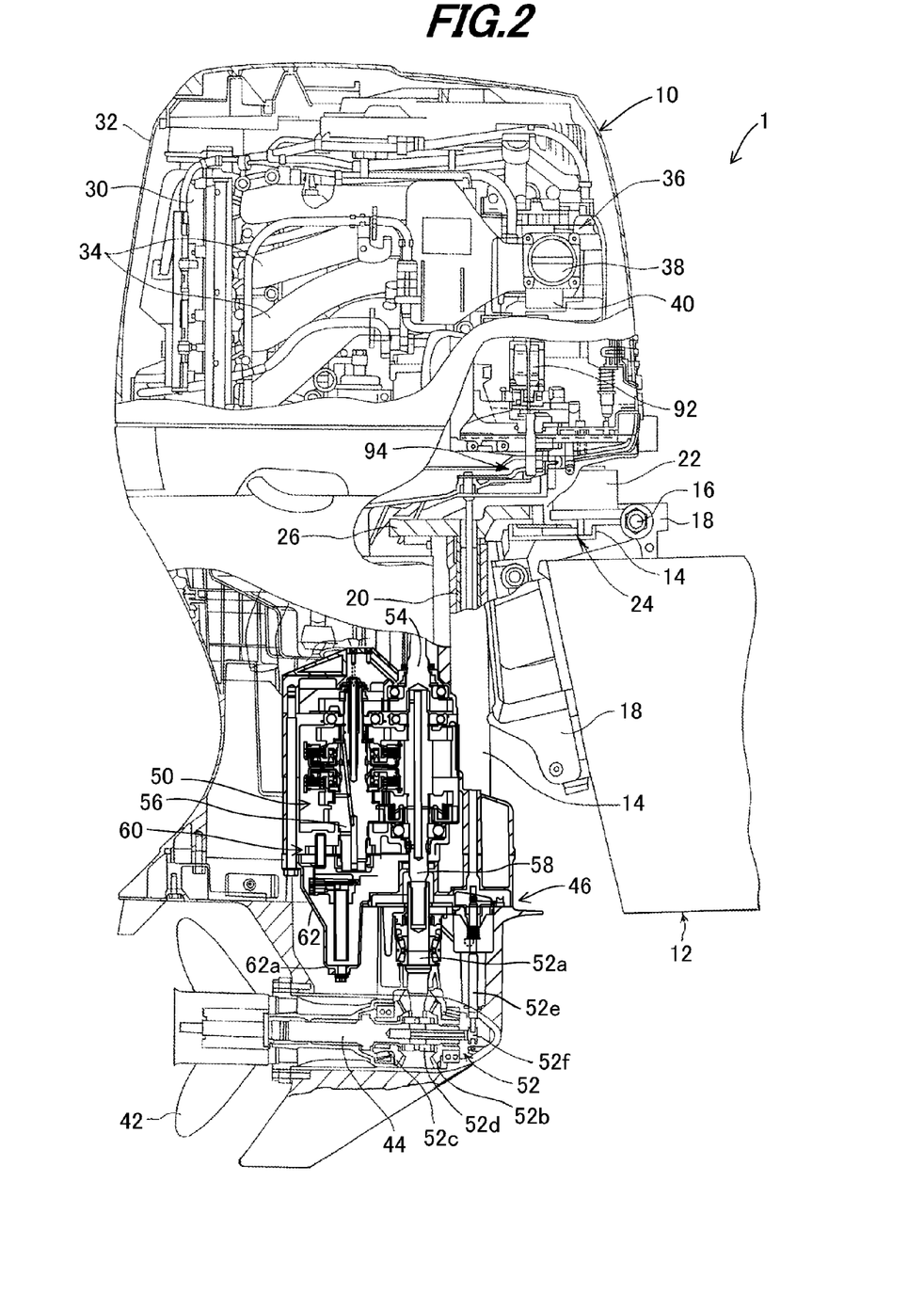
FIG. 2 is an enlarged sectional side view partially showing the outboard motor shown in FIG. 1.

FIG. 1 is an overall schematic view of an outboard motor control apparatus including a boat according to a first embodiment of the invention. FIG. 2 is an enlarged sectional side view partially showing the outboard motor shown in FIG. 1 and FIG. 3 is an enlarged side view of the outboard motor.

Figure 3:
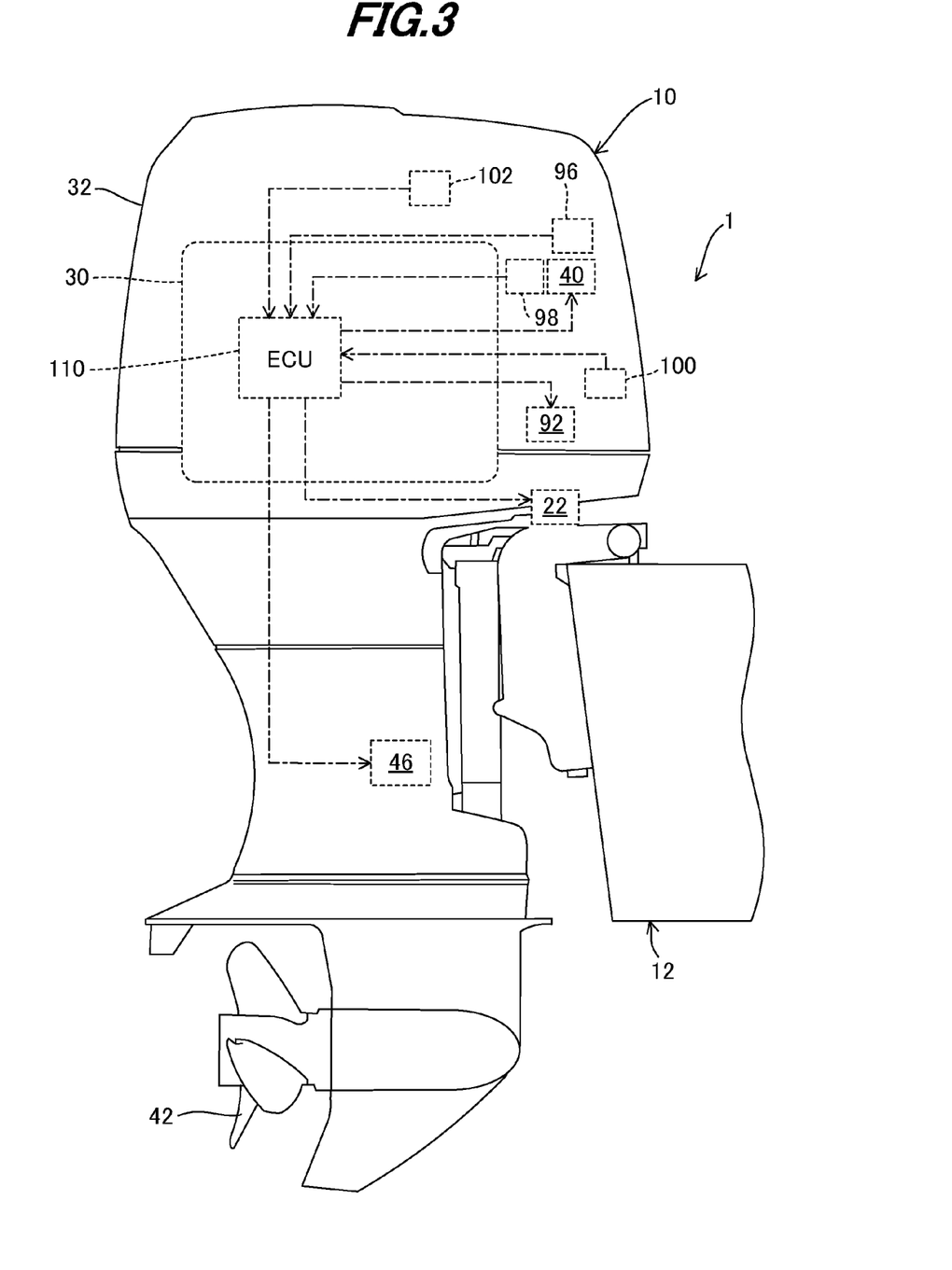
FIG. 3 is an enlarged side view of the outboard motor shown in FIG. 1.

In FIGS. 1 to 3, a symbol 1 indicates a boat or vessel whose hull 12 is mounted with an outboard motor 10. As clearly shown in FIG. 2, the outboard motor 10 is clamped (fastened) to the stern or transom of the hull 12 through a swivel case 14, tilting shaft 16 and stern brackets 18.

An electric steering motor (actuator) 22 for operating a shaft 20 which is housed in the swivel case 14 to be rotatable about the vertical axis is installed above the swivel case 14. A rotational output of the steering motor 22 is transmitted to the shaft 20 via a speed reduction gear mechanism 24 and a mount frame 26, whereby the outboard motor 10 is steered about the shaft 20 as a steering axis to the right and left directions (steered about the vertical axis).

An internal combustion engine (hereinafter referred to as the "engine") 30 is disposed in the upper portion of the outboard motor 10. The engine 30 comprises a spark-ignition, water-cooling gasoline engine with a displacement of 2,200 cc. The engine 30 is located above the water surface and covered by an engine cover 32.

An air intake pipe 34 of the engine 30 is connected to a throttle body 36. The throttle body 36 has a throttle valve 38 installed therein and an electric throttle motor (actuator) 40 for opening and closing the throttle valve 38 is integrally disposed thereto.

The output shaft of the throttle motor 40 is connected to the throttle valve 38 via a speed reduction gear mechanism (not shown). The throttle motor 40 is operated to open and close the throttle valve 38, thereby regulating the flow rate of the air sucked in the engine 30 to control engine speed NE of the engine 30.

The outboard motor 10 further comprises a propeller shaft (power transmission shaft) 44 that is supported to be rotatable about the horizontal axis and attached with a propeller 42 at its one end to transmit power output of the engine 30 thereto, and a transmission (automatic transmission) 46 that is interposed at a location between the engine 30 and propeller shaft 44 and has a plurality of gear positions, i.e., first, second and third speeds.

The transmission 46 comprises a transmission mechanism 50 that can selectively change the gear position to establish speeds including the first to third speeds, and a shift mechanism 52 that can change a shift position among forward, reverse and neutral positions.

Figure 4:
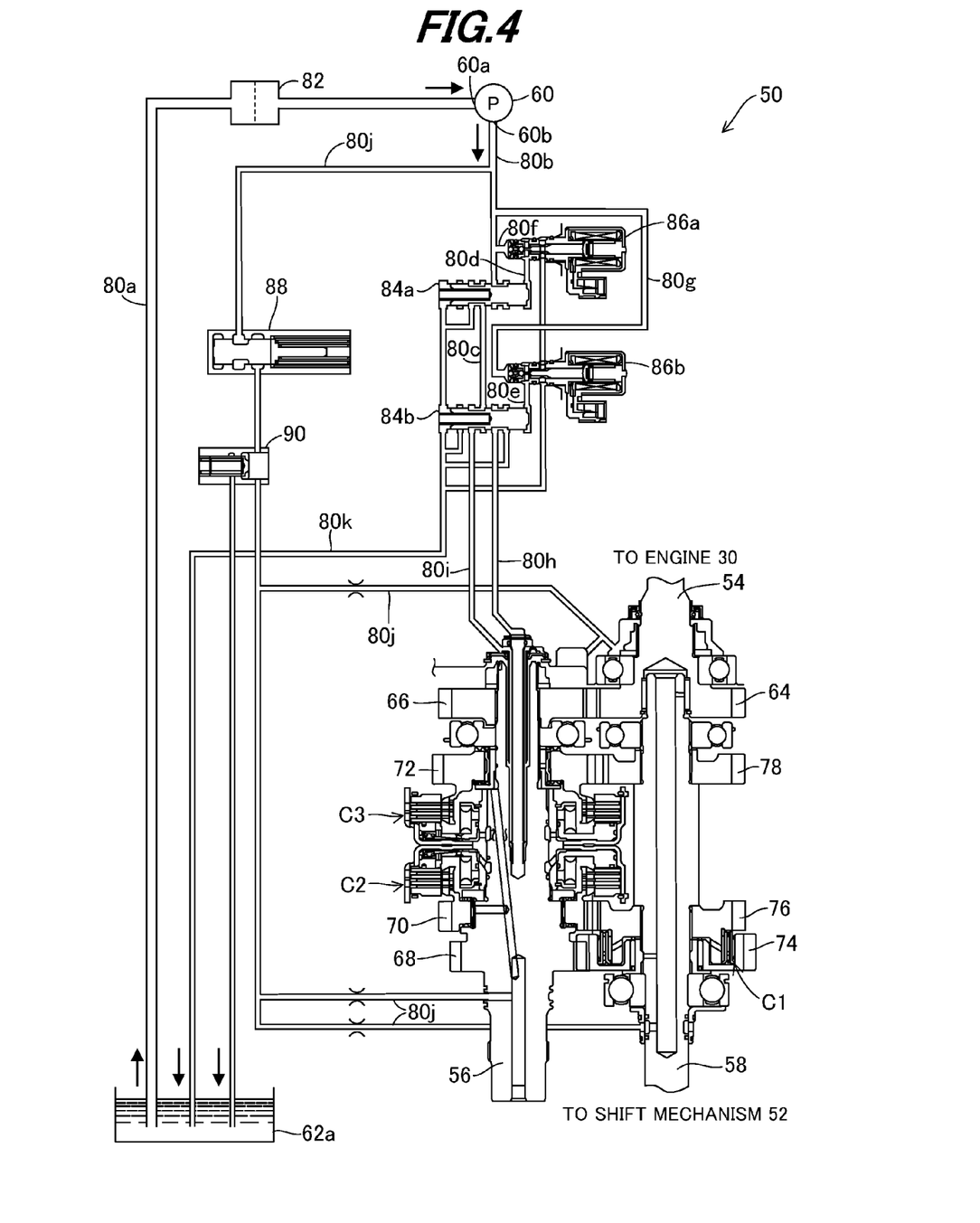
FIG. 4 is a hydraulic circuit diagram schematically showing a hydraulic circuit of a transmission mechanism shown in FIG. 2.

FIG. 4 is a hydraulic circuit diagram schematically showing a hydraulic circuit of the transmission mechanism 50.

As shown in FIGS. 2 and 4, the transmission mechanism 50 comprises a parallel-axis type transmission mechanism with distinct gear positions (ratios), which includes an input shaft 54 connected to the crankshaft (not shown in the figures) of the engine 30, a countershaft 56 connected to the input shaft 54 through a gear, and an output shaft 58 connected to the countershaft 56 through several gears. Those shafts 54, 56, 58 are installed in parallel.

The countershaft 56 is connected with a hydraulic pump (gear pump; shown only in FIG. 2) 60 that pumps up the operating oil (lubricating oil) and forwards it to transmission clutches and lubricated portions of the transmission mechanism 50 (explained later). The foregoing shafts 54, 56, 58, hydraulic pump 60 and the like are housed in a case 62 (shown only in FIG. 2). An oil pan 62a for receiving the operating oil is formed at the bottom of the case 62.

In the so-configured transmission mechanism 50, the gear installed on the shaft to be rotatable relative thereto is fixed on the shaft through the transmission clutch so that one of the gear positions (i.e., first to third speeds) is established (selected), and the output of the engine 30 is changed with the established (selected) gear position and transmitted to the propeller 42 through the shift mechanism 52 and propeller shaft 44. A gear ratio (speed reduction ratio) of the gear position is set to be the highest in the first speed and decreases as the gear position changes to second and then third speed.

The further explanation on the transmission mechanism 50 will be made. As clearly shown in FIG. 4, the input shaft 54 is supported with an input primary gear 64. The countershaft 56 is supported with a counter primary gear 66 to be meshed with the input primary gear 64, and also with a counter first-speed gear 68, counter second-speed gear 70 and counter third-speed gear 72.

The output shaft 58 is supported with an output first-speed gear 74 to be meshed with the counter first-speed gear 68, an output second-speed gear 76 to be meshed with the counter second-speed gear 70, and an output third-speed gear 78 to be meshed with the counter third-speed gear 72.

In the above configuration, when the output first-speed gear 74 supported to be rotatable relative to the output shaft 58 is brought into a connection with the output shaft 58 through a first-speed clutch C1, the first speed (gear; gear position) is established. The first-speed clutch C1 comprises a one-way clutch (or sprag clutch). When a second-speed or third-speed hydraulic clutch C2 or C3 (explained later) is supplied with hydraulic pressure so that the second or third speed is established and the rotational speed of the output shaft 58 becomes greater than that of the output first-speed gear 74, the first-speed clutch C1 makes the output first-speed gear 74 rotate idly (i.e., rotate without being meshed).

When the counter second-speed gear 70 supported to be rotatable relative to the countershaft 56 is brought into a connection with the countershaft 56 through the second-speed hydraulic clutch C2, the second speed (gear; gear position) is established. Further, when the counter third-speed gear 72 supported to be rotatable relative to the countershaft 56 is brought into a connection with the countershaft 56 through the third-speed hydraulic clutch C3, the third speed (gear; gear position) is established. The hydraulic clutches C2, C3 connect the gears 70, 72 to the countershaft 56 upon supply of the operating oil, while making the gears 70, 72 rotate idly when the operating oil is not supplied.

The interconnections between the gears and shafts through the clutches C1, C2, C3 are performed by controlling hydraulic pressure supplied from the pump 60 to the hydraulic clutches C2, C3.

The further explanation will be made with reference to FIG. 4. An intake port 60a of the pump 60 is connected to the oil pan 62a through an oil passage 80a. The oil passage 80a is interposed with a strainer 82.

A discharge port 60b of the pump 60 is connected to a first switching valve 84a through an oil passage 80b and the first switching valve 84a is connected to a second switching valve 84b through an oil passage 80c. Each of the valves 84a, 84b has a movable spool installed therein. The spool is urged by a spring at its one end (left end in the drawing) toward the other end.

The first and second switching valves 84a, 84b are connected on the sides of the other ends of the spools with first and second electromagnetic solenoid valves (linear solenoid valves) 86a, 86b through oil passages 80d, 80e, respectively. The solenoid valves 86a, 86b are interposed at oil passages 80f, 80g which are branched from the oil passage 80b.

The second switching valve 84b is connected to the second-speed hydraulic clutch C2 through an oil passage 80h, while being connected to the third-speed hydraulic clutch C3 through an oil passage 80i.

The discharge port 60b is also connected to the lubricated portions (e.g., the shafts 54, 56, 58, etc.) of the transmission 46 through the oil passage 80b and an oil passage 80j branched therefrom. The oil passage 80j is interposed with a regulator valve 88 that regulates hydraulic pressure to be supplied to the lubricated portions, and a relief valve 90 that, when the hydraulic pressure of the operating oil regulated by the regulator valve 88 becomes equal to or greater than prescribed pressure, returns the operating oil to the oil pan 62a.

The first and second switching valves 84a, 84b and the first and second solenoid valves 86a, 86b are connected with an oil passage 80k adapted to relieve pressure and an end of the oil passage 80k is open at the oil pan 62a.

As configured above, the pump 60 driven by the engine 30 (more exactly, the countershaft 56 of the transmission 46 transmitted with the output of the engine 30) pumps up the operating oil in the oil pan 62a through the oil passage 80a and strainer 82 and forwards it from the discharge port 60b to the first switching valve 84a and the first and second solenoid valves 86a, 86b through the oil passage 80b and the like. The pump 60 also supplies the operating oil (lubricating oil) to the lubricated portions of the transmission 46 through the oil passage 80j, regulator valve 88 and relief vale 90.

Upon being supplied with current (i.e., made ON), a spool housed in the first solenoid valve 86a is displaced to output the hydraulic pressure supplied from the pump 60 to the other end side of the spool of the first switching valve 84a. The spool of the first switching valve 84a is displaced in response to the hydraulic pressure outputted to its other end side, thereby forwarding the operating oil in the oil passage 80b to the oil passage 80c.

Similarly to the first solenoid valve 86a, upon being supplied with current (i.e., made ON), a spool of the second solenoid valve 86b is displaced to output the hydraulic pressure supplied from the pump 60 to the other end side of the spool of the second switching valve 84b.

When the second solenoid valve 86b is made ON and the hydraulic pressure is outputted to the other end side of the spool of the second switching valve 84b so that the spool is displaced, the operating oil in the oil passage 80c is forwarded to the second-speed hydraulic clutch C2 through the oil passage 80h. In contrast, when the second solenoid valve 86b is not supplied with current (made OFF) and the hydraulic pressure is not outputted to the other end side, the second switching valve 84b forwards the operating oil in the oil passage 80c to the third-speed hydraulic clutch C3 through the oil passage 80i.

Consequently, when the first and second solenoid valves 86a, 86b are both made OFF, the hydraulic pressure is not supplied to the hydraulic clutches C2, C3 and hence, the output first-speed gear 74 and output shaft 58 are interconnected through the first-speed clutch C1 so that the first speed is established.

When the first and second solenoid valves 86a, 86b are both made ON, the hydraulic pressure is supplied to the second-speed hydraulic clutch C2 and accordingly, the counter second-speed gear 70 and countershaft 56 are interconnected so that the second speed is established. As mentioned in the foregoing, when the second speed is established and the rotational speed of the output shaft 58 exceeds that of the output first-speed gear 74, the gear 74 is disconnected from the shaft 58 by the first-speed clutch C1 and therefore rotated idly.

Further, when the first solenoid valve 86a is made ON and the second solenoid valve 86b is made OFF, the hydraulic pressure is supplied to the third-speed hydraulic clutch C3 and accordingly, the counter third-speed gear 72 and countershaft 56 are interconnected so that the third speed is established. As in the case of the second speed, the output first-speed gear 74 is rotated idly. Thus, one of the gear positions of the transmission 46 is selected (i.e., transmission control is conducted) by controlling ON/OFF of the first and second switching valves 84a, 84b.

The explanation on FIG. 2 is resumed. The shift mechanism 52 comprises a drive shaft (vertical shaft) 52a that is connected to the output shaft 58 of the transmission mechanism 50 and installed parallel to the vertical axis to be rotatably supported, a forward bevel gear 52b and reverse bevel gear 52c that are connected to the drive shaft 52a to be rotated, a clutch 52d that can engage the propeller shaft 44 with either one of the forward bevel gear 52b and reverse bevel gear 52c, and other components.

The interior of the engine cover 32 is disposed with an electric shift motor (actuator) 92 that drives the shift mechanism 52. The output shaft of the shift motor 92 can be connected via a speed reduction gear mechanism 94 with the upper end of a shift rod 52e of the shift mechanism 52. When the shift motor 92 is operated, its output appropriately displaces the shift rod 52e and a shift slider 52f to move the clutch 52d to change the shift position among the forward, reverse and neutral positions.

When the shift position is forward or reverse, the rotational output of the output shaft 58 is transmitted via the shift mechanism 52 to the propeller shaft 44 to rotate the propeller 42 in one of the directions making the hull 12 move forward or rearward. The outboard motor 10 is equipped with a power source (not shown) such as a battery or the like attached to the engine 30 to supply operating power to the motors 22, 40, 92, etc.

As shown in FIG. 3, a throttle opening sensor (throttle opening change amount detector) 96 is installed near the throttle valve 38 and produces an output or signal indicative of opening of the throttle valve 38, i.e., throttle opening TH. An absolute pressure sensor (manifold absolute pressure detector) 98 is installed downstream of the throttle valve 38 in the air intake pipe 34 and produces an output or signal proportional to manifold absolute pressure Pb.

A neutral switch 100 is installed near the shift rod 52e and produces an ON signal when the shift position of the transmission 46 is neutral and an OFF signal when it is forward or reverse. A crank angle sensor 102 is installed near the crankshaft of the engine 30 and produces a pulse signal at every predetermined crank angle.

The outputs of the foregoing sensors and switch are sent to an Electronic Control Unit (ECU) 110 disposed in the outboard motor 10. The ECU 110 which has a microcomputer including a CPU, ROM, RAM and other devices is installed in the engine cover 32 of the outboard motor 10.

As shown in FIG. 1, a steering wheel 114 is installed near a cockpit (the operator's seat) 112 of the hull 12 to be manipulated or rotated by the operator (not shown). A steering angle sensor 116 attached on a shaft (not shown) of the steering wheel 114 produces an output or signal corresponding to the steering angle applied or inputted by the operator through the steering wheel 114.

A remote control box 120 provided near the cockpit 112 is equipped with a shift/throttle lever (throttle lever) 122 installed to be manipulated by the operator. The lever 122 can be moved or swung in the front-back direction from the initial position and is used by the operator to input a forward/reverse change command and an engine speed regulation command including an acceleration/deceleration command or instruction. A lever position sensor 124 is installed in the remote control box 120 and produces an output or signal corresponding to a position of the lever 122.

A switch 126 is also provided near the cockpit 112 to be manually operated by the operator to input a fuel consumption decreasing command for decreasing fuel consumption of the engine 30. The switch 126 is manipulated or pressed when the operator desires to travel the boat 1 with high fuel efficiency, and upon the manipulation, it produces a signal (ON signal) indicative of the fuel consumption decreasing command. The outputs of the sensors 116, 124 and switch 126 are also sent to the ECU 110.

Based on the inputted outputs, the ECU 110 controls the operation of the motors 22, 40, 92 and performs the transmission control of the transmission 46. Thus, the outboard motor control apparatus according to the embodiment is a Drive-By-Wire type apparatus whose operation system (steering wheel 14, lever 122) has no mechanical connection with the outboard motor 10.

Figure 5:
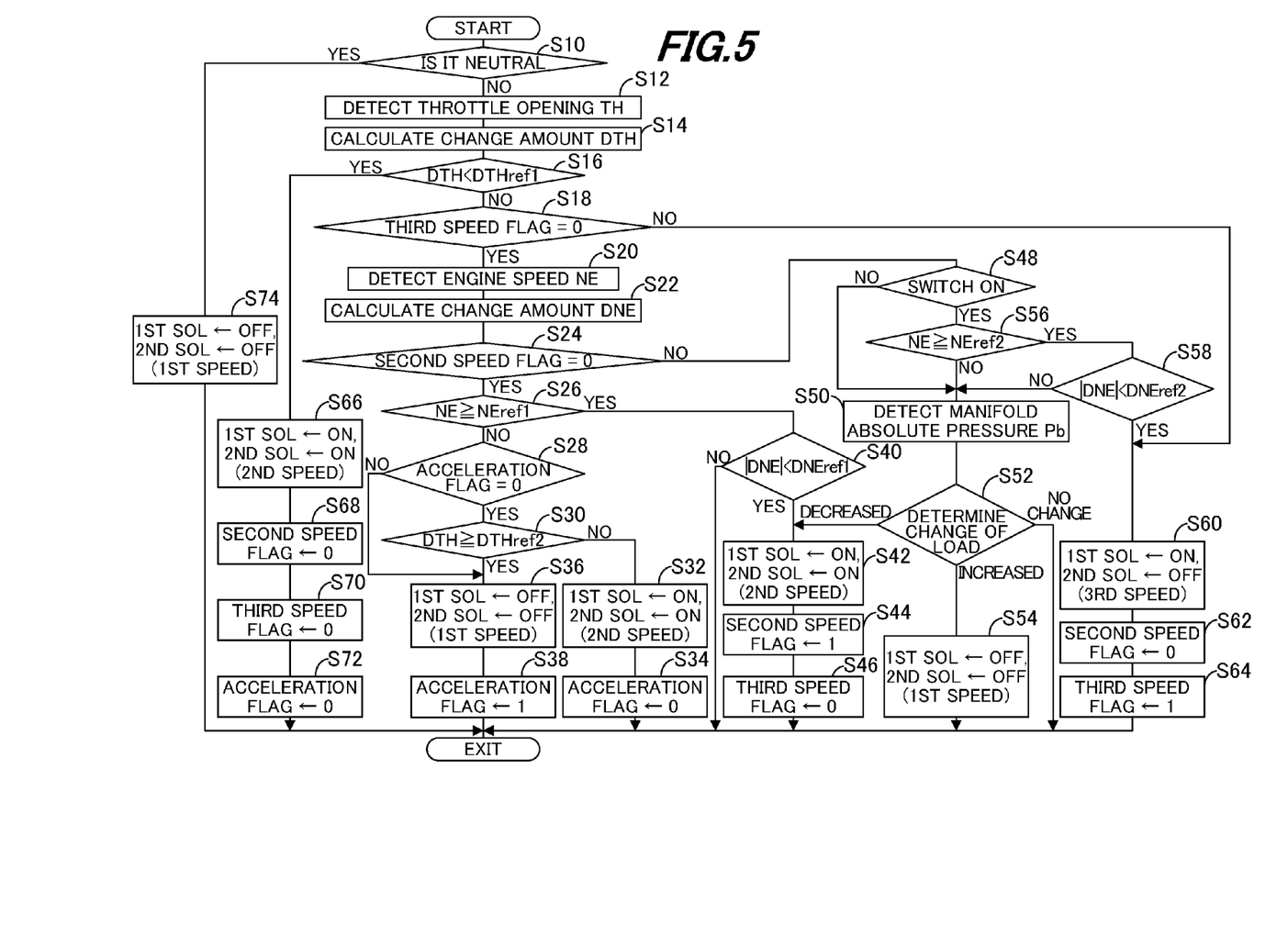
FIG. 5 is a flowchart showing transmission control operation by an electronic control unit shown in FIG. 1.

FIG. 5 is a flowchart showing the transmission control operation by the ECU 110. The illustrated program is executed by the ECU 110 at predetermined intervals, e.g., 100 milliseconds.

The program begins at S10, in which it is determined whether the shift position of the transmission 46 is neutral. This determination is made by checking as to whether the neutral switch 100 outputs the ON signal. When the result in S10 is negative, i.e., it is determined to be in gear, the program proceeds to S12, in which the throttle opening TH is detected or calculated from the output of the throttle opening sensor 96, and to S14, in which a change amount (variation) DTH of the detected throttle opening TH per unit time (e.g., 500 milliseconds) is detected or calculated.

The program proceeds to S16, in which it is determined whether the deceleration is instructed to the engine 30 by the operator, i.e., whether the engine 30 is in the operating condition to decelerate the boat 1. This determination is made by checking as to whether the throttle valve 38 is operated in the closing direction, i.e., whether the change amount DTH is less than a first predetermined value DTHref1 (e.g., −0.5 degree).

Specifically, when the change amount DTH is less than the first predetermined value DTHref1 set to a negative value, the throttle valve 38 is determined to be operated in the closing direction (i.e., the deceleration is instructed to the engine 30) and when the change amount DTH is equal to or greater than the first predetermined value DTHref1, the throttle valve 38 is determined to be substantially stopped or operated in the opening direction (i.e., the deceleration is not instructed).

When the result in S16 is negative, the program proceeds to S18, in which it is determined whether the bit of an after-acceleration third-speed changed flag (explained later; hereinafter called the "third speed flag") which indicates that the gear position has been changed to the third speed after the acceleration was completed, is 0. Since the initial value of this flag is 0, the result in S18 in the first program loop is generally affirmative and the program proceeds to S20.

In S20, the output pulses inputted from the crank angle sensor 102 are counted to detect or calculate the engine speed NE and in S22, a change amount (variation) DNE of the engine speed NE is calculated. The change amount DNE is obtained by subtracting the engine speed NE detected in the present program loop from that detected in the previous program loop.

Next, the program proceeds to S24, in which it is determined whether the bit of an after-acceleration second-speed changed flag (hereinafter called the "second speed flag") is 0. The bit of this flag is set to 1 when the gear position is changed from the first speed to the second speed after the acceleration is completed (explained later), and otherwise, reset to 0.

Since the initial value of the second speed flag is also 0, the result in S24 in the first program loop is generally affirmative and the program proceeds to S26, in which it is determined whether the engine speed NE is equal to or greater than a first predetermined speed NEref1. The first predetermined speed NEref1 will be explained later.

Since the engine speed NE is less than the first predetermined speed NEref1 generally in a program loop immediately after the engine start, the result in S26 is negative and the program proceeds to S28, in which it is determined whether the bit of an acceleration determining flag (explained later; indicated by "acceleration flag" in the drawing) is 0. Since the initial value of this flag is also 0, the result in S28 in the first program loop is generally affirmative and the program proceeds to S30.

In S30, it is determined whether the acceleration (precisely, the rapid acceleration) is instructed to the engine 30 by the operator, i.e., whether the engine 30 is in the operating condition to accelerate the boat 1 (rapidly). This determination is made by checking as to whether the throttle valve 38 is operated in the opening direction rapidly.

Specifically, the change amount DTH of the throttle opening TH detected in S14 is compared with a second predetermined value DTHref2 and when the change amount DTH is equal to or greater than the second predetermined value DTHref2, it is determined that the throttle valve 38 is operated in the opening direction rapidly, i.e., the acceleration is instructed to the engine 30. The second predetermined value DTHref2 is set as a criterion (e.g., 0.5 degree) for determining whether the acceleration is instructed to the engine 30.

When the result in S30 is negative, i.e., it is determined that neither the acceleration nor the deceleration is instructed to the engine 30, in other words, it is immediately after the engine start or in the condition where the boat 1 cruises at constant speed, the program proceeds to S32, in which the first and second solenoid valves 86a, 86b (indicated by "1ST SOL," "2ND SOL" in the drawing) are both made ON to select the second speed in the transmission 46, and to S34, in which the bit of the acceleration determining flag is reset to 0.

On the other hand, when the result in S30 is affirmative, the program proceeds to S36, in which the first and second solenoid valves 86a, 86b are both made OFF to change the transmission 46 (shift down the gear) from the second speed to the first speed. As a result, the output torque of the engine 30 is amplified through the transmission 46 (precisely, the transmission mechanism 50) which has been shifted down to the first speed, and transmitted to the propeller 42 via the drive shaft 52a and propeller shaft 44, thereby improving the acceleration performance.

The program proceeds to S38, in which the bit of the acceleration determining flag is set to 1, whereafter the program is terminated. Specifically, the bit of the acceleration determining flag is set to 1 when the acceleration is determined to be instructed to the engine 30 and the transmission 46 is changed from the second speed to the first speed, and otherwise, reset to 0. Upon setting of the bit of the acceleration determining flag to 1, the result in S28 in the next and subsequent loops becomes negative and the program skips S30 and proceeds to S36 and S38.

Thus, since the transmission 46 is set in the second speed during a period from when the engine 30 is started until the acceleration is determined to be instructed (i.e., during the normal operation), it becomes possible to ensure the usability of the outboard motor 10 similarly to that of an outboard motor having no transmission.

After the transmission 46 is changed to the first speed in S36, when the engine speed NE is gradually increased and the acceleration through the torque amplification in the first speed is completed (i.e., the acceleration range is saturated), the engine speed NE reaches the first predetermined speed NEref1. Subsequently, in the next program loop, the result in S26 becomes affirmative and the program proceeds to S40 onward. The first predetermined speed NEref1 is set to a relatively high value (e.g., 6000 rpm) as a criterion for determining whether the acceleration in the first speed is completed.

In S40, it is determined whether the engine speed NE is stable, i.e., the engine 30 is stably operated. This determination is made by comparing an absolute value of the change amount DNE of the engine speed NE calculated in S22 with a first prescribed value DNEref1. When the absolute value is less than the first prescribed value DNEref1, the engine speed NE is determined to be stable. The first prescribed value DNEref1 is set as a criterion (e.g., 500 rpm) for determining whether the engine speed NE is stable, i.e., the change amount DNE is relatively small.

When the result in S40 is negative, the program is terminated with the first speed being maintained, and when the result is affirmative, the program proceeds to S42, in which the first and second solenoid valves 86a, 86b are both made ON to change the transmission 46 (shift up the gear) from the first speed to the second speed. It causes the increase in the rotational speed of the drive shaft 52a and that of the propeller shaft 44, so that the boat speed reaches the maximum speed (in a range of the engine performance), thereby improving the speed performance.

After the step of S42, in S44, the bit of the second speed flag is set to 1 and in S46, the bit of the third speed flag is reset to 0.

Upon setting of the bit of the second speed flag to 1 in S44, the result in S24 in the next and subsequent loops becomes negative and the program proceeds to S48. Thus, when the bit of the second speed flag is set to 1, i.e., when the gear position is changed to the second speed after the acceleration in the first speed is completed, the process of S48 onward is conducted.

In S48, it is determined whether the switch 126 outputs the ON signal, i.e., whether the fuel consumption decreasing command for the engine 30 is inputted by the operator. When the result in S48 is negative, the program proceeds to S50, in which, based on the output of the absolute pressure sensor 98, the change amount DPb of the manifold absolute pressure Pb of the air intake pipe 34 is detected or calculated and to S52, in which, based on the detected change amount DPb of the manifold absolute pressure Pb and the change amount DTH of the throttle opening TH, it is determined whether load of the engine 30 has changed.

To be specific, in the case where, for example, the boat 1 climbs up and goes over a relatively big wave during cruising, the wave influences the resistance of water flow acting on the boat 1 to increase. It results in the decrease of the engine speed NE and the insufficiency (decrease) of the output torque of the engine 30, thereby decreasing the boat speed.

Therefore, in this embodiment, the insufficiency of the output torque of the engine 30 due to the influence of a wave is detected or estimated based on change of load of the engine 30 and when the output torque insufficiency is detected, the transmission 46 is changed from the second speed to the first speed to amplify the output torque through the transmission 46 so as to compensate for the insufficiency.

Specifically, in S52, when the change amount DTH is less than a third predetermined value (first predetermined value) DTHref3 (e.g., 0.5 degree) and the manifold absolute pressure Pb is decreased by first predetermined pressure (second predetermined value) Pbref1 or more within a predetermined time period (e.g., 500 milliseconds), i.e., the change amount DPb of the manifold absolute pressure Pb is equal to or greater than the second predetermined value in a decreasing direction, it is determined that the engine load has changed in the increasing direction due to the influence of a wave and the output torque is insufficient.

More specifically, when the manifold absolute pressure Pb is decreased by the first predetermined pressure Pbref1 or more despite the fact that the throttle opening TH hardly changes, it is estimated that the engine load has changed due to the influence of a wave. The third predetermined value DTHref3 is set as a criterion for determining whether the change of the throttle opening TH is relatively small and the first predetermined pressure Pbref1 is set as a criterion (e.g., 10 kPa) for determining whether the engine load has changed due to the influence of a wave.

When it is determined in S52 that there is no change or relatively small change in the engine load, the program is terminated, while when the load is determined to have changed in the increasing direction, the program proceeds to S54, in which the first and second solenoid valves 86a, 86b are both made OFF to change the transmission 46 (shift down the gear) from the second speed to the first speed. As a result, the insufficiency of the output torque due to the influence of a wave is compensated by amplifying the output torque through the transmission 46 shifted down to the first speed, thereby suppressing the decrease in the boat speed.

When the program proceeds to S52 after the gear position is changed from the second speed to the first speed in S54 in a previous program loop, the determination as to the change in the engine load is made again. Explaining this in detail, after the boat 1 has gone over a big wave, the increased resistance of water flow acting on the boat 1 decreases and it results in the increase of the engine speed NE. Since the insufficient condition of the output torque of the engine 30 ends accordingly, it is not necessary to amplify the output torque through the transmission 46 shifted down to the first speed.

Therefore, in this embodiment, the end of the insufficient condition of the engine output torque is detected or estimated based on the change in the engine load and when it is detected that the insufficient condition has ended, the gear position is changed (returned) from the first speed to the second speed.

Specifically, in S52, when the change amount DTH of the throttle opening TH is less than the third predetermined value DTHref3 and the manifold absolute pressure Pb is increased by second predetermined pressure Pbref2 or more within a predetermined time period (e.g., 500 milliseconds), i.e., when a change amount DPb of the manifold absolute pressure Pb in the predetermined time period is equal to or greater than a third predetermined value Pbref2, it is determined that the engine load has changed in the decreasing direction because the boat 1 has gone over a wave and the insufficient condition of the output torque has ended.

More specifically, when the manifold absolute pressure Pb is increased by the second predetermined pressure Pbref2 or more despite the fact that the throttle opening TH hardly changes, it is estimated that the engine load has changed (decreased) because there is no longer any influence of a wave. The second predetermined pressure Pbref2 is set as a criterion (e.g., 10 kPa) for determining whether the engine load has changed because there is no longer any influence of a wave.

When, in S52, the engine load is determined to have changed in the decreasing direction, the program proceeds to S42, in which the first and second solenoid valves 86a, 86b are both made ON to change the transmission 46 from the first speed to the second speed as explained, and then to the aforementioned steps of S44 and S46.

When the result in S48 is affirmative, the program proceeds to S56, in which it is determined whether the engine speed NE is equal to or greater than a second predetermined speed NEref2. The second predetermined speed NEref2 is set to a value (e.g., 5000 rpm) slightly lower than the first predetermined speed NEref1, as a criterion for determining whether it is possible to change the gear position to the third speed (explained later).

When the result in S56 is affirmative, the program proceeds to S58, in which, similarly to S40, it is determined whether the engine speed NE is stable. Specifically, the absolute value of the change amount DNE of the engine speed NE is compared with a second prescribed value DNEref2. When the absolute value is less than the second prescribed value DNEref2, the engine speed NE is determined to be stable, and vice versa. The second prescribed value DNEref2 is set as a criterion (e.g., 500 rpm) for determining whether the change amount DNE is relatively small and the engine speed NE is stable.

When the result in S58 is negative or that in S56 is negative, the program proceeds to the aforementioned steps of S50 and S52, while, when the result in S58 is affirmative, the program proceeds to S60, in which the first solenoid valve 86a is made ON and the second solenoid valve 86b is made OFF to change the transmission 46 (shift up the gear) from the second speed to the third speed. As a result, the engine speed NE is decreased, thereby decreasing the fuel consumption, i.e., improving the fuel efficiency.

Next, the program proceeds to S62, in which the bit of the second speed flag is reset to 0, and to S64, in which the bit of the third speed flag is set to 1. Thus, the third speed flag is set to 1 when the gear position is changed from the second speed to the third speed after the acceleration is completed, and otherwise, reset to 0.

In a program loop after the bit of the third speed flag is set to 1, the result in S18 is negative and the aforementioned process of S60 to S64 is conducted, whereafter the program is terminated with the third speed being maintained.

When the result in S16 is affirmative, i.e., the deceleration is determined to be instructed, the program proceeds to S66, in which the first and second solenoid valves 86a, 86b are both made ON to change the transmission 46 to the second speed. Then the program proceeds to S68, S70 and S72, in which all bits of the second speed flag, third speed flag and acceleration determining flag are reset to 0, whereafter the program is terminated.

Under the condition where the second speed is established, when the lever 122 is manipulated by the operator to change the shift position of the transmission 46 to neutral, the result in S10 becomes affirmative and the program proceeds to S74, in which the first and second solenoid valves 86a, 86b are both made OFF to change the transmission 46 from the second speed to the first speed.

Figure 6:
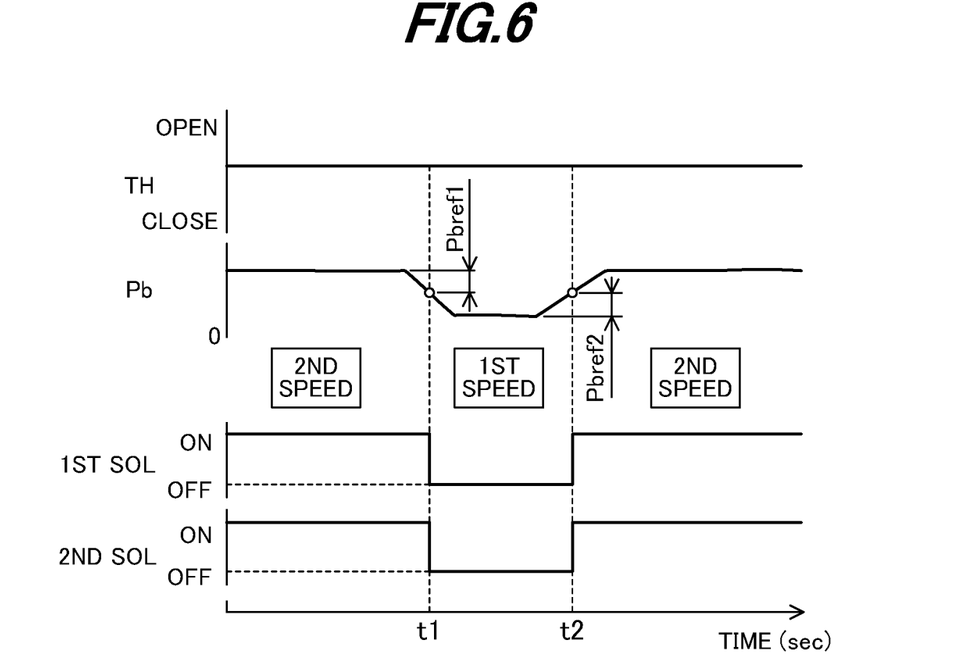
FIG. 6 is a time chart for explaining the operation of the FIG. 5 flowchart.

FIG. 6 is a time chart for explaining the transmission control operation through the load change determination conducted in S52, S54 and S42 of the FIG. 5 flowchart.

As shown in FIG. 6, under the condition where the second speed of the transmission 46 is established after the acceleration is completed, when, at the time t1, the change amount DTH is less than the third predetermined value DTHref3 (i.e., the throttle opening TH hardly changes) and the manifold absolute pressure Pb is decreased by the first predetermined pressure Pbref1 or more (S52), it is determined that the output torque of the engine 30 is insufficient, so that the gear position is changed from the second speed to the first speed (S54).

After the gear position is changed to the first speed, when, at the time t2, the change amount DTH is less than the third predetermined value DTHref3 and the manifold absolute pressure Pb is increased by the second predetermined pressure Pbref2 or more (S52), it is determined that the boat 1 has gone over a wave and the insufficient condition of the output torque has ended, so that the gear position is changed from the first speed to the second speed (S42).

As stated above, the embodiment is configured to have an apparatus and a method for controlling operation of an outboard motor (10) adapted to be mounted on a stern of a boat (12) and having an internal combustion engine (30) to power a propeller (42) through a propeller shaft (44), and a transmission (46) installed at a location between the engine and the propeller shaft, the transmission being selectively changeable in gear position to establish speeds including at least a first speed and a second speed and transmitting power of the engine to the propeller with a gear ratio determined by established speed, comprising: a throttle opening change amount detector (throttle opening sensor 96, ECU 110, S14) that detects a change amount of throttle opening (DTH) of the engine (30): a manifold absolute pressure change amount detector (98, 110, S50) that detects a change amount of manifold absolute pressure (DPb) in an air intake pipe (34) of the engine (30): and a transmission controller (ECU 110, S52, S54) that controls operation of the transmission to change the gear position from the second speed to the first speed when the second speed is established based on the change amount of the throttle opening and the change amount of the manifold absolute pressure, more specifically, the transmission controller is configured to control the operation of the transmission to change the gear position from the second speed to the first speed when the change amount of the throttle opening (DTH) is less than a first predetermined value (third predetermined value DTHref3) and the change amount of the manifold absolute pressure (DPb) is equal to or greater than a second predetermined value (Pbref1) in a decreasing direction (S52, S54).

With this, even when the resistance of water flow acting on the hull 12 during cruising is increased due to the influence of a wave, it becomes possible to appropriately control the operation of the transmission 46, thereby suppressing the decrease in the boat speed.

Specifically, when the change amount DTH of the throttle opening TH is less than the first predetermined value (third predetermined value DTHref3) and the change amount DPb of the manifold absolute pressure PB is equal to or greater than a second predetermined value (Pbref1) in a decreasing direction (when the manifold absolute pressure Pb is decreased despite the fact that the throttle opening TH does not greatly change), it is determined that the boat 1 climbs up and goes over a relatively big wave and accordingly, the resistance of water flow acting on the hull 12 is increased due to the influence of the wave and the output torque is insufficient.

To cope with it, the transmission 46 is changed from the second speed to the first speed (to amplify the output torque through the transmission 46 and transmit it to the propeller shaft 44). With this, even when the resistance of water flow acting on the hull 12 is thus increased, it becomes possible to compensate for the insufficiency in the output torque by amplifying it through the transmission 46, thereby suppressing the decrease in the boat speed.

In the apparatus and method, the transmission controller controls the operation of the transmission to change back the gear position from the first speed to the second speed when the change amount of the manifold absolute pressure (DPb) is equal to or greater than a third predetermined value (Pbref2) in an increasing direction (S52, S42).

Thus, after the gear position is changed to the first speed, when the manifold absolute pressure Pb is increased by the third predetermined pressure Pbref2 or more, it is determined that the resistance of water flow acting on the hull 12 is decreased because the boat 1 has gone over a wave and the insufficient condition of the output torque has ended, and the gear position is changed (returned) from the first speed to the second speed at that timing. With this, it becomes possible to more reliably control the operation of the transmission 46 in accordance with the cruising condition of the boat 1.

The apparatus and method further include: a neutral position determiner (neutral switch 100, ECU 110, S10) that determines whether the transmission is in a neutral position; and the transmission controller controls the operation of the transmission to change the gear position from the second speed to the first speed when the second speed is established and the transmission is determined to be in the neutral position (S10, S74).

The apparatus and method further include: a hydraulic clutch (C2) that is installed in the transmission and adapted to establish the speeds including the first speed and the second speed; and the transmission controller controls the operation of the transmission to establish the first speed when the clutch is not supplied with hydraulic pressure.

Specifically, the transmission 46 is configured to establish the second speed in the normal operation, and establish the first speed when the transmission clutch (C2) is not supplied with the hydraulic pressure from the pump 60, while establishing the second speed when it is supplied. With this, it becomes possible to limit the operation of the pump 60, thereby decreasing the fuel consumption of the engine 30. In other words, when the transmission 46 is in the neutral position, the gear position is changed from the second speed to the first speed (in which the hydraulic pressure is not supplied to the transmission clutch (C2) from the pump 60), thereby achieving the above effect.

It should be noted that, although the first to third predetermined values DTHref1, DTHref2, DTHref3, first and second predetermined pressures Pbref1, Pbref2, displacement of the engine 30 and other values are indicated with specific values in the foregoing, they are only examples and not limited thereto.

Japanese Patent Application No. 2009-285807, filed on Dec. 16, 2009 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling operation of an outboard motor adapted to be mounted on a stern of a boat and having an internal combustion engine to power a propeller through a propeller shaft, and a transmission installed at a location between the engine and the propeller shaft, the transmission being selectively changeable in gear position to establish speeds including at least a first speed and a second speed and transmitting power of the engine to the propeller with a gear ratio determined by established speed, comprising:
 a throttle opening change amount detector that detects a change amount of throttle opening of the engine:
 a manifold absolute pressure change amount detector that detects a change amount of manifold absolute pressure in an air intake pipe of the engine: and
 a transmission controller that controls operation of the transmission to change the gear position from the second speed to the first speed when the second speed is established based on the change amount of the throttle opening and the change amount of the manifold absolute pressure, wherein the change amount of the throttle opening is less than a first predetermined value and the change amount of the manifold absolute pressure is equal to or greater than a second predetermined value in a decreasing direction.

2. The apparatus according to claim 1, wherein the transmission controller controls the operation of the transmission to change back the gear position from the first speed to the second speed when the change amount of the manifold absolute pressure is equal to or greater than a third predetermined value in an increasing direction.

3. The apparatus according to claim 1, further including:
 a neutral position determiner that determines whether the transmission is in a neutral position;
 and the transmission controller controls the operation of the transmission to change the gear position from the second speed to the first speed when the second speed is established and the transmission is determined to be in the neutral position.

4. The apparatus according to claim 3, further including:
 a hydraulic clutch that is installed in the transmission and adapted to establish the speeds including the first speed and the second speed;
 and the transmission controller controls the operation of the transmission to establish the first speed when the clutch is not supplied with hydraulic pressure.

5. A method for controlling operation of an outboard motor adapted to be mounted on a stern of a boat and having an internal combustion engine to power a propeller through a propeller shaft, and a transmission installed at a location between the engine and the propeller shaft, the transmission being selectively changeable in gear position to establish speeds including at least a first speed and a second speed and transmitting power of the engine to the propeller with a gear ratio determined by established speed, comprising the step of:
 detecting a change amount of throttle opening of the engine;
 detecting a change amount of manifold absolute pressure in an air intake pipe of the engine; and
 controlling operation of the transmission to change the gear position from the second speed to the first speed when the second speed is established based on the change amount of the throttle opening and the change amount of the manifold absolute pressure, wherein the change amount of the throttle opening is less than a first predetermined value and the change amount of the manifold absolute pressure is equal to or greater than a second predetermined value in a decreasing direction.

6. The method according to claim 5, wherein the step of transmission controlling controls the operation of the transmission to change back the gear position from the first speed to the second speed when the change amount of the manifold absolute pressure is equal to or greater than a third predetermined value in an increasing direction.

7. The method according to claim 5, further including the step of:
 determining whether the transmission is in a neutral position;
 and the step of transmission controlling controls the operation of the transmission to change the gear position from the second speed to the first speed when the second speed is established and the transmission is determined to be in the neutral position.

8. The method according to claim 7, wherein the step of transmission controlling controls the operation of the transmission to establish the first speed when a hydraulic clutch adapted to establish the speeds including the first speed and the second speed is not supplied with hydraulic pressure.

* * * * *